May 3, 1932.　　　　F. E. MACART　　　　1,856,839
ROTARY INTERNAL COMBUSTION ENGINE
Filed Aug. 23, 1927　　　4 Sheets-Sheet 1
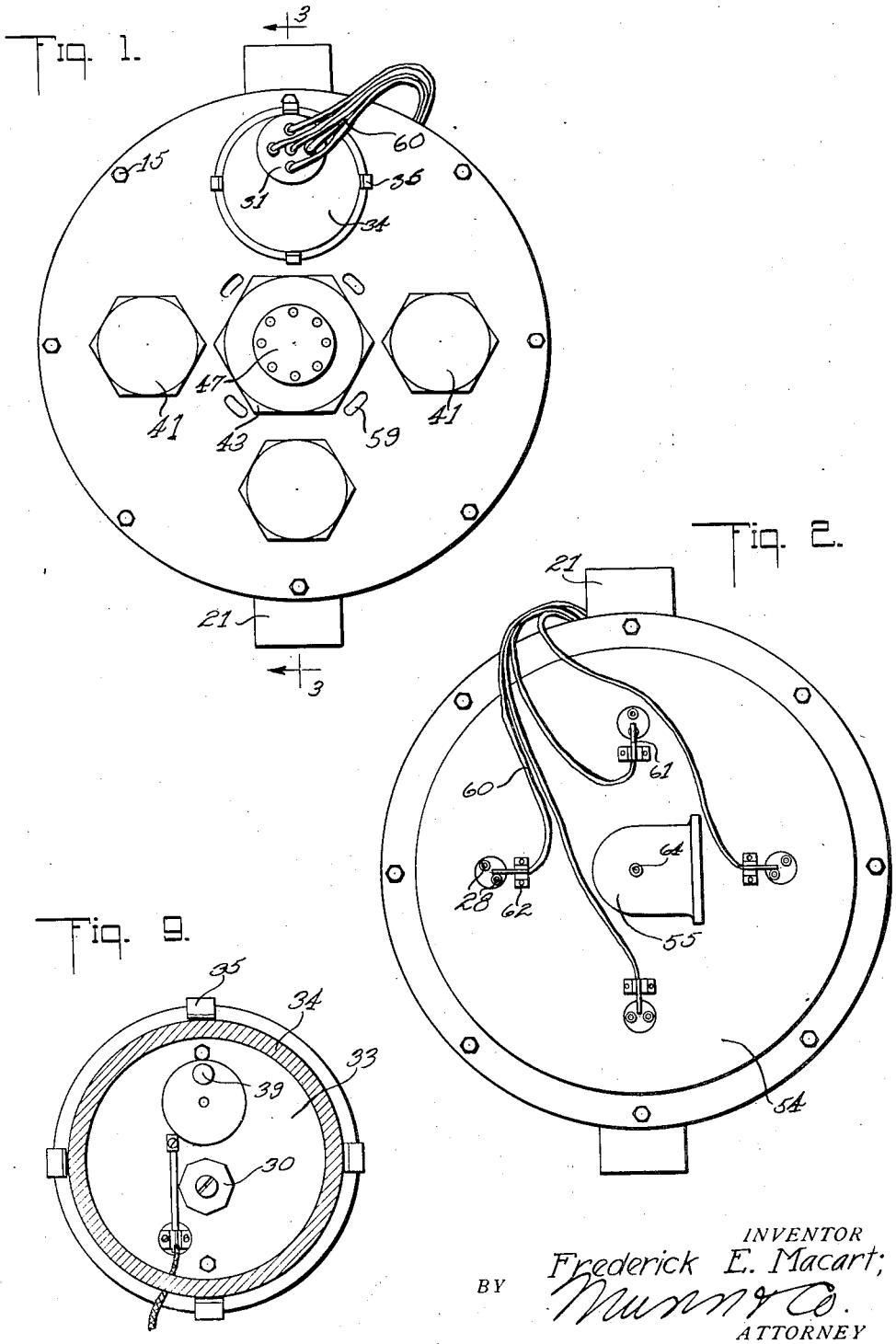
INVENTOR
Frederick E. Macart;
BY
ATTORNEY

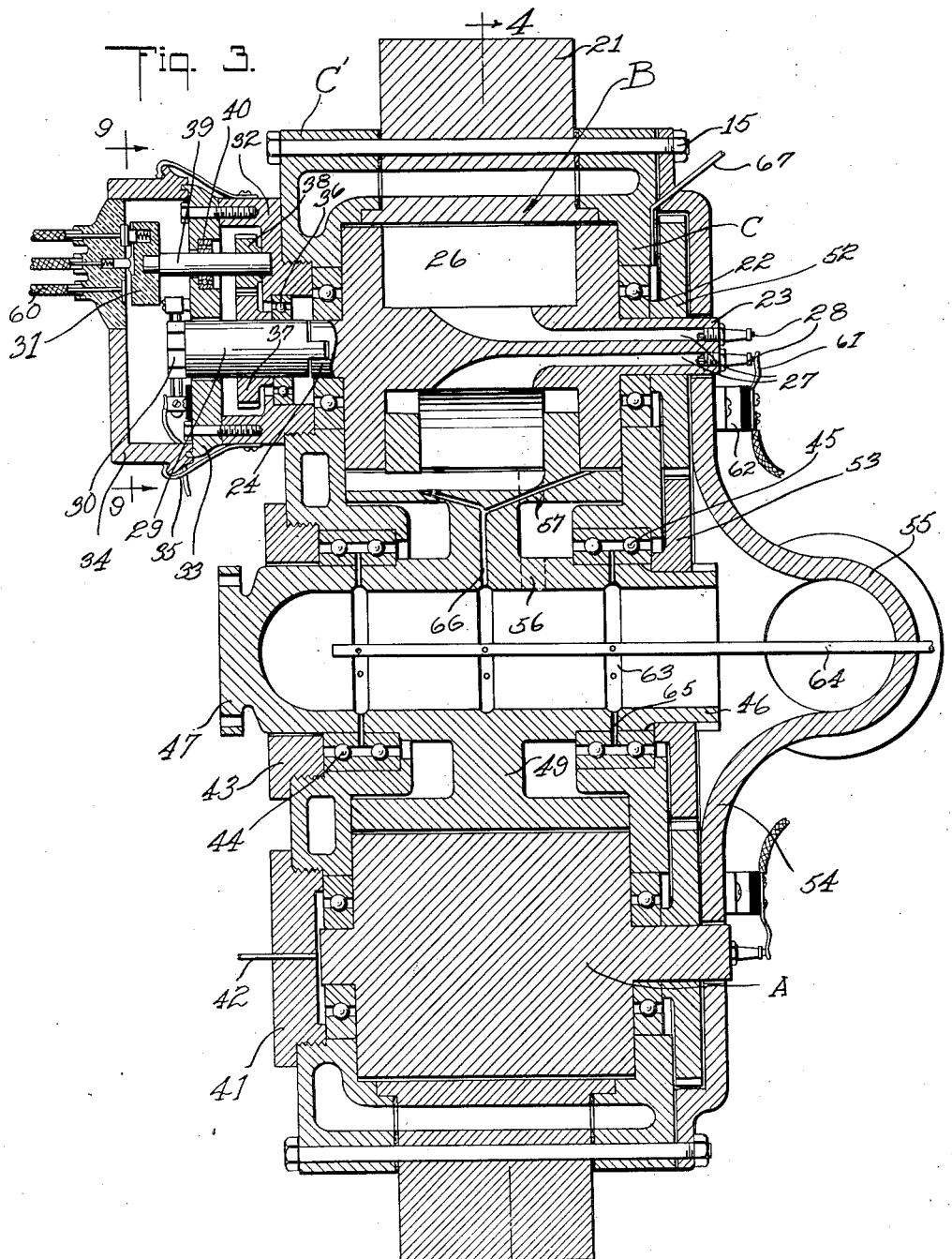

May 3, 1932.  F. E. MACART  1,856,839
ROTARY INTERNAL COMBUSTION ENGINE
Filed Aug. 23, 1927  4 Sheets-Sheet 3
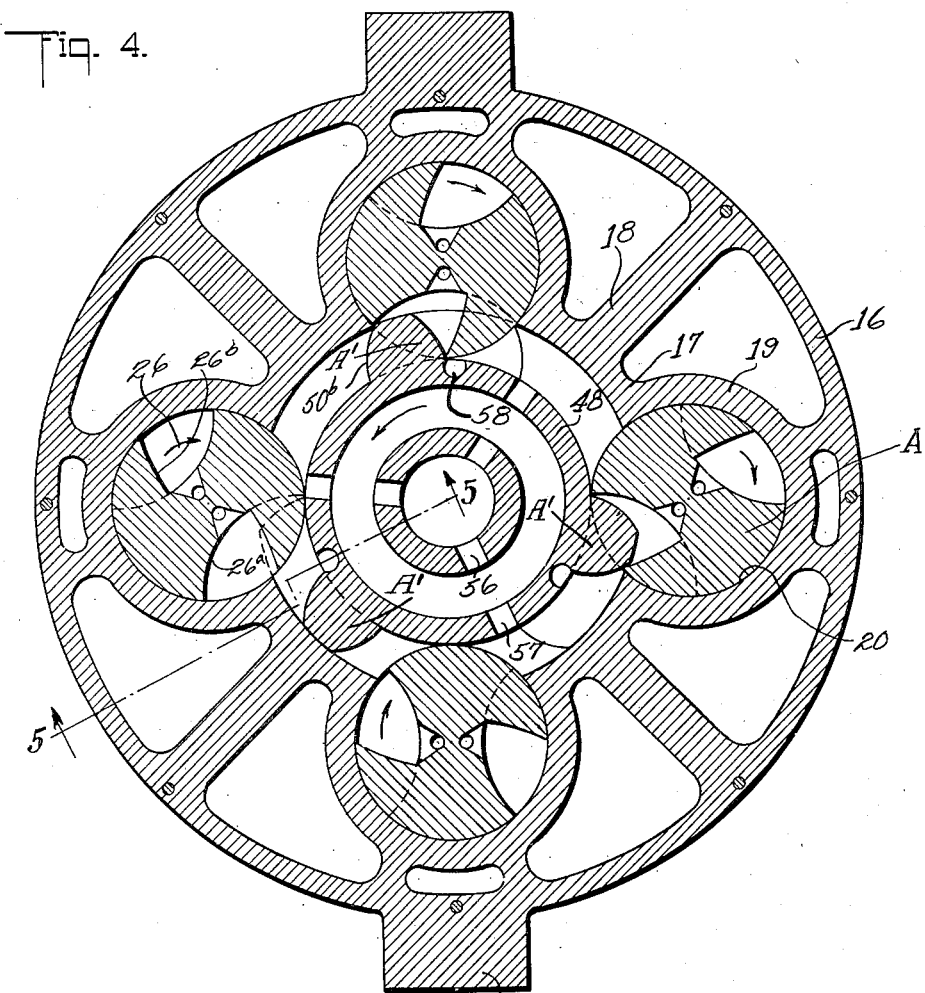
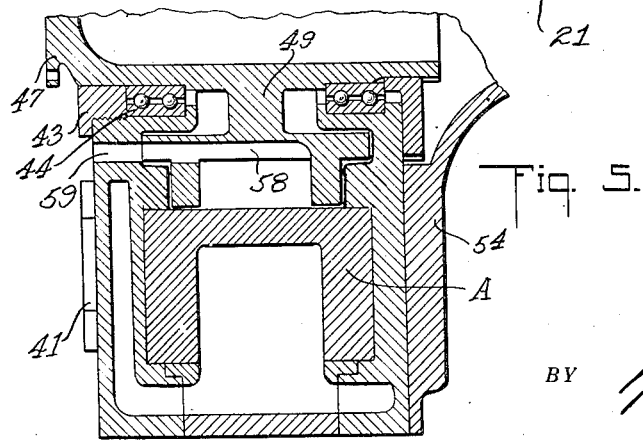
INVENTOR
Frederick E. Macart;
BY
ATTORNEY May 3, 1932. F. E. MACART 1,856,839
ROTARY INTERNAL COMBUSTION ENGINE
Filed Aug. 23, 1927  4 Sheets-Sheet 4
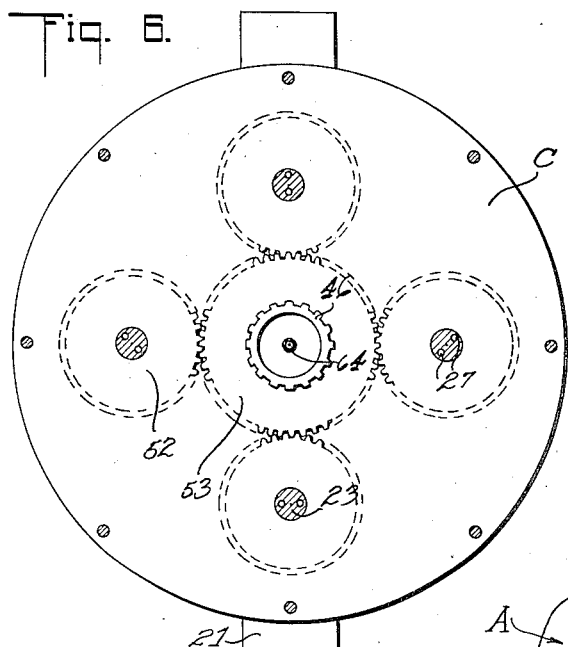
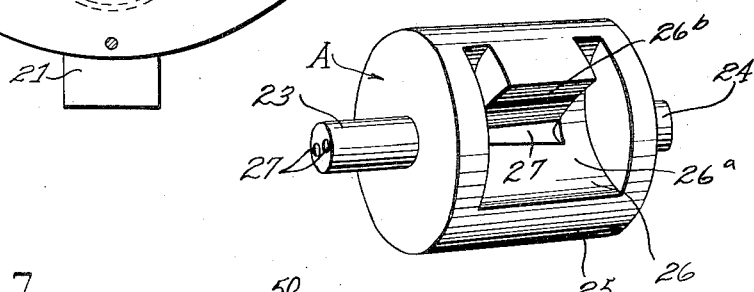
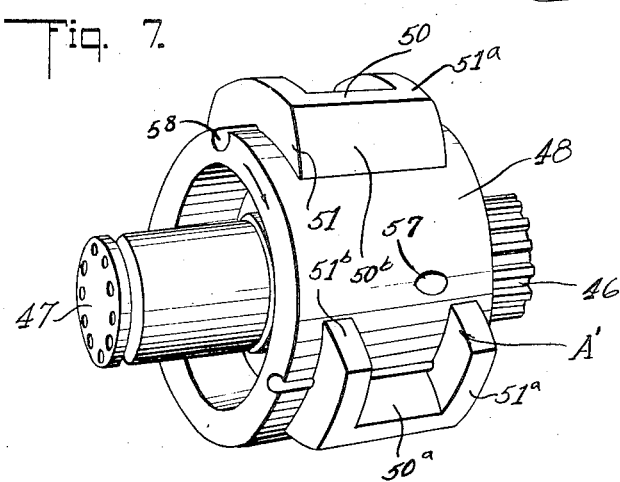
INVENTOR
Frederick E. Macart;
BY Munn & Co.
ATTORNEY Patented May 3, 1932

1,856,839

UNITED STATES PATENT OFFICE

FREDERICK E. MACART, OF LOS ANGELES, CALIFORNIA

ROTARY INTERNAL COMBUSTION ENGINE

Application filed August 23, 1927. Serial No. 214,917.

My invention relates to internal combustion engines of the rotary type, and it has for a purpose the provision of an engine devoid of reciprocating parts, and an engine having a greater number of power impulses per revolution than engines heretofore proposed, whereby greater power per unit of weight is developed as well as a steady flow of power, which renders the engine particularly useful for marine work.

It is also a purpose of my invention to provide a rotary internal combustion engine constructed of a minimum number of parts capable of being readily disassembled and assembled and hence readily accessible for repair and replacement.

A further purpose of my invention is the provision of a rotary engine in which high compression is attained, thereby permitting a relatively low grade of fuel to be used.

I will describe only one form of rotary internal combustion engine embodying my invention and will then point out the novel features in claims.

In the accompanying drawings:

Fig. 1 is a view showing in rear elevation one form of rotary internal combustion engine embodying my invention;

Fig. 2 is a view showing the engine in front elevation;

Fig. 3 is an enlarged vertical sectional view taken on the line 3—3 of Fig. 1;

Fig. 4 is a central vertical sectional view taken at right angles to Fig. 3;

Fig. 5 is a sectional view taken on the line 5—5 of Fig. 4;

Fig. 6 is a view similar to Fig. 2 with the gear cover removed;

Fig. 7 is a detail perspective view of the rotor of the engine;

Fig. 8 is a detail perspective view of one of the revolving abutments embodied in the engine; and Fig. 9 is a sectional view taken on the line 9—9 of Fig. 3.

Similar reference characters refer to similar parts in each of the several views.

In carrying out my invention, I provide a stator which, as illustrated to advantage in Fig. 3, comprises a main body section designated generally at B, and two cover sections C and C', both of which are secured to the opposite sides of the main body sections by means of bolts 15 arranged at regular spaced intervals circumferentially of the stator, as shown in Fig. 4. The main body section B comprises an outer annulus 16 connected to an inner annulus 17 by radial webs 18 and other webs 19, the latter being curved and arranged in pairs to form arcuate seats 20 for revolving abutments A.

A construction and arrangement of the annuli and webs are such as to provide intervening compartments which are closed by the cover plates C and C' to form water jackets for cooling the seats 20 as well as the inner periphery of the annulus 17. Diametrical projections 21 are formed on the body section B for the purpose of providing means by which the engine, as a unit, can be secured in upright position upon any suitable support.

As shown in Fig. 3, the cover plates C and C' are formed axially with the opening provided by the annulus 17, and with other openings in which ball bearings are located for the reception of the stub shafts 23 and 24 of the revolving abutments A.

As illustrated to advantage in Fig. 8, each abutment A comprises an annular body 25 from the ends of which project the stub shafts 23 and 24. The body 25 is formed with diametrically and reversely disposed pockets 26, both of which are substantially U form and provided with curved surfaces 26$^a$ and 26$^b$. The solid projection of which 26$^b$ is one surface, fills the space between the parallel sides 51, Fig. 7. This is more clearly shown in Fig. 4, and herein lies an advantage to be pointed out hereinafter. The surface 26$^b$ seals the combustion chamber and presents the compressed gas to the rear side of the rotor abutment, where it is fired. Surface 26$^b$ is smaller in area than 26$^a$ and herein lies another advantage to be pointed out later on. The stub shaft 23 of each abutment is provided with two passages 27 located concentrically with respect to the center of the shaft and communicating at their inner ends with the pockets 26, and at their outer ends with spark plugs 28. The stub shaft 24 for the uppermost abutment A (this view showing single ignition only) has a rabbeted connection with a short length of shaft 29 (Fig. 3) the latter operating an interrupter 30 and distributer 31 for supplying current in proper timed relation to the several concentrically moving spark plugs 28. The interrupter and distributer are contained within a housing comprising an inner section 32 having an extension which is interchangeable with plugs 41, for dual ignition and is threaded in one or all of the openings for plugs 41 of the cover plate C'. The housing, to make accessible the gears 37 and 38, also includes an intermediate section 33 bolted to the inner section and, to make the interrupter and distributer accessible this intermediate section is covered by an outer section 34 secured in place by means of spring clips 35.

A ball bearing 36 is provided for the shaft 29, and keyed to the shaft is a pinion 37 meshing with a smaller pinion 38 fixed to a shaft 39, journaled in a bearing 40 contained in the intermediate section 33. The shaft 39 extends into the outer housing section where it is fixed to the distributing head for actuating the latter.

Since each pocket 26 of which there are two, to each stator abutment, forms part of a combustion chamber, it is obvious that since these chambers are separate and independent that they should each contain a spark plug. Therefore, my spark plugs are located concentrically with the center of the stator abutment stub shaft 23, and describe a circle which is tangent to the stationary electrode located on end cover plate 54. This electrode is one of four, each one of which in succession is supplied with a high tension electric current every 30° of rotor travel, but in a sequence which prevents all of them, excepting the one in connection with the spark plug to be fired, from carrying this current to any other spark plug. By referring to Fig. 3, I can make this clear.

Since their diameters are in the ratio of one and a half to one the stator abutment shaft travels at one and a half times the rotor shaft speed, an eight point cam on the shaft 29, driven by the stator abutment shaft, will give us an interruption of the breaker points every 45° of rotation of shaft 29, while rotor shaft 46 has traveled but 30°. The distributer shaft 39 runs at twice the speed of shaft 29 and three times the speed of shaft 46. Since we want an explosion or power impulse every 30°, move shaft 46 through 30°, shaft 29 moves 45°, cam causes points to break contact and primary current is interrupted, secondary current discharges from coil (not shown) to center of distributer, across distributer rotor brush, which is under a certain one of the wires 60, follows that wire to the certain spark plug now positioned under it and fires this plug. Under the force of the explosion shaft 46 travels 30° more, shaft 29 45° more, and shaft 39 90° more where another spark plug is fired, and so on for every 30° of travel of main rotor shaft 46.

It follows that the rotor distributer brush 31 makes three revolutions to the main rotor shaft 46 one, and that each lead wire to an electrode 61 is "hot", or carrying current, three times to one revolution of the main rotor shaft 46, and that each time a lead wire was hot, there was a spark plug in contact with it, and at no other time was it hot nor was there a spark plug in contact with it.

The other openings of the cover plate C' which would contain ignition units as described above, if dual ignition were used are closed by the screw plugs 41 through which extend tubes 42 for supplying a lubricant to the bearings 22. The stator section C' is also provided with a screw plug or collar 43 within the central opening of the section for the purpose of confining within the stator a ball bearing 44. This bearing cooperates with a second bearing 45 to prevent end thrust and to rotatably support a shaft 46 with the stator, said shaft constituting the main shaft of the engine and from which power can be transmitted in any suitable manner. As shown in Fig. 3, the shaft 46 forms part of the fuel and oil admission system and is tubular in form, one end being open and the other closed and provided with a head 47 to which a shaft to be driven can be bolted.

The shaft 46 has fixed thereto a rotor which operates within the stator, and this rotor comprises, in the present instance, a circular body 48 surrounding and secured to the shaft 46 by a flange 49. The outer periphery of the body 48 is provided with three vanes each indicated generally at A' arranged 120° apart, and when considering intermediate portion 50 in relation with parallel portion 51$^a$, each of substantially U form, as illustrated in Fig. 7. Each abutment A' which is narrower than the body 48 comprises an intermediate portion 50 parallel to the shaft 46 and having an inner curved surface 50$^a$ and an outer curved face 50$^b$. The abutment also includes parallel portions 51 extending circumferentially of the body 48 and having outer curved surfaces 51$^a$ and curved end surfaces 51$^b$.

The curvature of the surfaces 50$^a$, 50$^b$, and 51$^b$ are such as to define sections of three separate epicycloids for the purpose of causing the rotor abutments to have proper interfitting charge sealing relation with respect to the pockets 26 of the stator abutments in the form of chambers in which the fuel charges are fired and all the expanding charge caused to spend its driving force wholly on or between the rotating stator abutment and the rotor abutment.

As illustrated in Fig. 4, the rotor body 48 is of such diameter that when applied within the stator body section B it provides, between the two, an annular working chamber which is subdivided into a plurality of working chambers by reason of the manner in which the revolving abutments A are associated with the rotor. These abutments A have rolling contact with the periphery of the rotor body 48 and by the provision of the pockets 26 and the space between the parallel portions 51, Fig. 7, coacting with $26^b$, Fig. 8, the rotor abutments A' and the stator abutments A are mutually permitted to pass in the rotative movement of the rotor. The stator abutments are placed 90° apart and are adapted to be continuously driven in a clockwise direction as when viewed in Fig. 4 by the provision of gears 52 which, as shown in Fig. 3, are fixed to the stub shafts 23 and continually mesh with a driving gear 53 splined to the open end of the rotor shaft 46. A cover plate 54 is bolted to the front side of the stator in covering relation to the gears 52 and 53 and the open end of the shaft 46, and this plate is constructed with a tubular enlargement 55 constituting part of an intake manifold and adapted for connection to a suitable source of fuel supply (not shown). From this intake manifold, through velocities imparted to them by kinetic energy and centrifugal force, fuel charges are induced into the working chambers between the rotor and the stator through intake ports 56 and 57 in the shaft 46 and rotor body 48, respectively.

In the present instance I employ three ports 56, and three ports 57 in registration with the ports 56 as illustrated in Fig. 4, and all of which are arranged 120° apart. The ports 57, any two of which are in communication with the working chambers of the engine for nearly 330° of each revolution of the rotor and are interposed at a predetermined point between the rotor abutments A' and in trailing relation thereto with respect to the anti-clockwise directional rotation of the rotor.

The exhaust of the spent charges from the working chambers and pockets 26 is effected through the provision of exhaust passages 58 in the periphery of the rotor body 48, and leading to exhaust ports 59 in the stator section C', all as illustrated in Figs. 1, 4, and 5.

Through the provision of suitable conductors 60, the spark plugs 28 are connected to the distributor 31. As shown in Figs. 2 and 3, the ends of the conductors are provided with contacts 61 secured to and insulated from brackets 62 secured to the cover plate 54, each contact being positioned so as to be tangent to a concentric circle and alternately engaged by the spark plugs 28 as they describe this circle about the center of and under the rotative movement of the corresponding stub shaft 23. It will, of course, be understood that in practice the distribution of current to the various spark plugs is so timed as to effect a firing of the fuel charge within the pockets 26 in a predetermined sequence every thirty degrees of rotor travel, as will be understood from the operation of the engine which is as follows:

With the parts of the engine in the position shown in Fig. 4 firing of a full charge has just occurred within the firing chamber formed between the upper stator and rotor abutments A and A'. The expansive force of the ignited charge is imposed on rotor abutment A' to drive the latter to the left and thereby impart counter-clockwise rotation of the rotor. To more fully illustrate this: At the firing point or through the upper stator abutment in Fig. 4, a straight line is drawn as a common diameter to stator abutment and rotor. It will be evident that surfaces $50^a$ and 50 are at such an angle with this line, that these surfaces favor the direction of rotation as the expanding gases impinge on them. The solid projection of which $26^b$ is one surface and which fills the space between the parallel portions 51, Fig. 7, also shown as a part of a crescent shape in Fig. 4, serves to seal the combustion chambers to the rear of the rotor abutment and prevent the igniting of the fresh gas occupying the working chamber between the upper stator abutment Fig. 4, and the next stator abutment as shown on the right-hand side of Fig. 4. This solid projection occupies a space, not filled with gas, and under the rotative influence of the rotor, and in favor of it, this space (as shown by the left-hand stator abutment Fig. 4) is added to the working chamber (as shown in the lower stator abutment Fig. 4). After this rotor abutment has traveled substantially 30° from a perpendicular line intersecting the axes of the top and bottom stator abutments, the power stroke has been completed, and at this instant the rotor exhaust passage 58 registers with the stator exhaust port 59, thus permitting the burned gases to exhaust to atmosphere. This exhaust stroke continues for the next 15° of movement of the rotor abutment during which the complete scavenging of the working chamber is effected as will be now explained.

This scavenging is accomplished by causing a charge of fresh gas to follow up the burned gases through ports 56, 57, pocket 26, the working chamber, and ports 58 and 59. This is accomplished by holding the exhaust port 59 open through the registering of ports 58 and 59 for a period of 15° during which time the inlet port 57 is also open to communicate with the working chamber, from which the exhaust gases are escaping to atmosphere. Now it follows that if inlet port 57 were closed at this time, 14.7 pounds per square inch of burned gases would remain in the working chambers, but since inlet port 57 is open the fresh charge enters the working chambers at a high velocity, imparted to it by kinetic energy and centrifugal force caused by its passage through the radial ports 56 and 57, which are rotating at a high velocity. Since this gas has a certain mass $m$ it is acted upon by two forces as just stated. Kinetic energy $=1/2mv^2$ plus the action of centrifugal force, $F=mv^2/r$. This rush of gas follows up the exhaust gas expelling it through ports 58 and 59, and under the rotative influence of the rotor, ports 58 and 59 cease to register after 15° of travel, thus cutting off the escape of this fresh gas charge to atmosphere through ports 58 and 59.

During approximately the next 45° of movement of the rotor abutment a fresh charge is supplied, through ports 56 and 57, to the working chambers and in the rear of the rotor abutment which has just fired where, by reason of the velocity imparted to the charge by kinetic energy and centrifugal force, and in relief of the negative pressure or vacuum created therein under the advance movement of the abutment, the working chamber is completely filled with fresh gas. To make this clear, in my engine, with the exception of such volume as occupied by the rotor an stator abutments, and but for a space of but 30° of rotor travel after the firing point of any combustion chamber, I utilize the remaining 330° of cylinder volume, as well as the other seven stator abutment pockets 26 to contain fresh gas. Since port 57 is in trailing relation to the rotor abutment which continues to move away from the stator abutment it is obvious that the volume of the working chambers is increased. By continuing to deliver gas to this increase in volume, and under the rotative influence of the rotor the forces acting on the gas velocity is thereby augmented and built up.

Since port 57 opens to a working chamber 31° after the firing point of one stator abutment and remains open to that chamber until it is closed by the next stator abutment, it follows that port 57 is open for nearly 90°. During this time three explosions have taken place in the firing chambers, and in the sequence of the firing order of the other three stator abutments. The firing order is clockwise as viewed in Fig. 4, while the direction of rotation of the rotor is anti-clockwise. One abutment of the four stator abutments is in the firing position with the rotor abutment once every 30° of rotor travel. One power impulse has been produced for every 30° of rotor travel, while the fuel charge which produced that power impulse of thirty degrees formerly occupied a volume greater than 90° of the rotor travel since pockets 26 also contained fuel left in it by the preceding rotor abutment.

Following the completion of intake, the charge is trapped in the one previously fired and also in the other of the pockets 26 of the first or upper stator abutment Fig. 4 and in the corresponding working chamber, through the coaction of such abutment with the periphery of the rotor body 48. I compress my gas through 90°, but after it is fired only 30° of rotor travel are used in absorbing the power from the expanding gases. This 30° of rotor travel is no more than completed when another power impulse is applied to the rotor and so on through every 30° of its travel during each and every revolution. Compressing through 90° and firing through 30° the power is built up and not allowed to fall off. The gas thus trapped is subsequently compressed under the advance movement of the succeeding rotor abutment.

As one power impulse is applied to one of the three abutments, the next to fire (which will be the right-hand one in Fig. 4. since the uppermost one has just been fired) is finishing its compression cycle of nearly 90°, and having but 30° left to go, will come to its firing point, will be fired, and the cycle thus completed; just at the end of the power stroke, and as the exhaust port is opening for the upper one in Fig. 4, or the one previously fired. Since there was no lag or lost motion between the finish of the power stroke of one, and the firing point of the other, it follows, that while one power impulse does not overlap the other, there is produced a series of continuous power impulses, one every 30° throughout the 360° or twelve per revolution, from but five working parts. By five I mean a rotor and four rotating stator abutments, constituting the five major working parts of the engine.

In the foregoing manner, the several rotor abutments coact with the several stator abutments to produce a power stroke for every 30° of rotation of the rotor, the firing order being clockwise as when viewed in Fig. 4, while the rotor's movement is counter-clockwise. By reason of the epicycloidal form of the surface of the rotor abutments coacting with the unequal surfaces of the stator abutments, the firing chambers thus formed cause the expanding forces of the charges to be fully expended on the rotor and stator abutments without retarding but adding too the rotational movement of the stator and rotor abutments, and thus producing an engine of maximum power and efficiency.

To lubricate the engine, the shaft 46 is provided on its inner periphery with a plurality of annular grooves 63 into which oil from a supply pipe 64 extends through the cover plate 54 and into the shaft 46 is discharged into the grooves and distributed by centrifugal force to the bearings 44 and 45 through radial ducts 65, and to the contacting surfaces of the rotor and stator abutments through ducts 66 (Fig. 3). The bearings 22 may be lubricated by the previously described pipes 42, and other pipes 67 through the cover plate 54 as shown in Fig. 3.

Although I have herein shown and described only one form of rotary internal combustion engine embodying my invention, it is to be understood that various changes and modifications may be made herein without departing from the spirit of the invention and the spirit and scope of the appended claims.

I claim:

1. A rotary internal combustion engine comprising a stator and a rotor forming therebetween a plurality of working chambers, revoluble abutments in the stator having diametrically opposed and reversely positioned independent pockets therein each adapted to alternately communicate with the working chambers, abutments fixed to the rotor each of said abutments following the cycles of induction, compression, firing, and exhaust and movable in the working chambers, the pockets of the stator abutments providing clearance for the rotor abutments and coacting therewith to form firing chambers, inlet ports in the rotor for supplying charges to the working chambers, exhaust ports in the stator, exhaust passages in the rotor adapted to register with the ports of the stator, and timed means for firing the charges supplied to the firing chambers.

2. A rotary internal combustion engine comprising a stator having revoluble abutments therein, stub shafts on the abutments journaled in the stator, a rotor within and spaced from the stator to form working chambers, means operatively connected to the rotor with all of the stub shafts for driving the stator abutments, pockets in the stator abutments providing clearance for the rotor abutments, pockets in the rotor abutments providing clearance for the stator abutments and coacting with the rotor abutments to form firing chambers, passages in the driven stub shafts communicating with said pockets spark plugs in said passages, timed ignition means including stationary contacts positioned to be engaged by the spark plugs as said plugs move concentrically about the center of stub shaft under the rotative movement of the stub shafts for igniting charges within the firing chambers, intake ports in the rotor by which charges are delivered to the working chambers, exhaust passages in the rotor, and exhaust ports in the stator with which the exhaust passages register to permit exhaust of spent charges from the working chambers.

3. In a rotary internal combustion engine, stator abutments revoluble about their own axes and having pockets therein, rotor abutments revoluble about the rotor as an axis and having pockets therein adapted to coact with the stator abutment pockets to form firing chambers, and coacting surfaces on the rotor and stator abutments for causing the rotor abutments to have interfitting relation with respect to the stator abutments and thus seal charges within the firing chambers.

4. In a rotary internal combustion engine, a stator having abutments revoluble therein, each of which is formed with a pocket, a rotor having fixed abutments each formed with a pocket adapted to coact with each pocket of the stator abutments to form a firing chamber, each stator abutment pocket having surfaces shaped and situated that the charges exploding in the firing chambers act to propel the rotor abutments.

5. In a rotary internal combustion engine, a stator having abutments revoluble therein, each of which is formed with a pocket, a rotor having fixed abutments each formed with a pocket adapted to coact with each pocket of the stator abutments to form a firing chamber, each stator abutment pocket having surfaces shaped and situated that the charges exploding in the firing chambers act to propel the rotor abutments, and each rotor abutment pocket having working surfaces favoring the direction of rotation of the rotor as expanding gases impinge upon them.

6. In a rotary internal combustion engine, a stator having revoluble abutments, a rotor having peripheral abutments coacting with the stator, stator abutments, and rotor to provide working chambers, radially disposed fuel intake ports in the rotor, and exhaust ports in the rotor and stator, the intake ports being so positioned in the rotor that fuel is forced into the working chambers through the ports in response to rotation of the rotor, and the position of the intake ports in respect to the exhaust ports and abutments being such that the fuel forced into the working chambers is caused to scavenge the latter of burnt gases following each explosion.

7. In a rotary internal combustion engine, a stator having circumferentially spaced abutments revoluble therein, a rotor having fixed peripheral abutments, the rotor being spaced from the stator and the stator abutments subdividing said space into working chambers, fuel intake ports in the rotor and exhaust ports in the rotor and stator, the rotor and stator abutments having pockets coacting to provide firing chambers, the intake ports being situated between the rotor abutments to admit fuel in advance of each rotor abutment in respect to the direction of rotation thereof so as to be compressed in the corresponding working chamber between said rotor abutment and the stator abutment which the rotor abutment approaches, and finally delivered to a pocket of said stator abutment, and means for firing the compressed charge within said pocket, said intake and exhaust ports being so positioned with respect to each other and so controlled by the stator abutments as to admit fresh fuel to each working chamber following firing of the charge therein in a manner to scavenge said chamber of burnt gases.

FREDERICK E. MACART.